United States Patent [19]

Takiguchi

[11] Patent Number: 4,567,928
[45] Date of Patent: Feb. 4, 1986

[54] PNEUMATIC TIRE SUITABLE FOR RUNNING ON SNOW AND ICE ROADS

[75] Inventor: Eiji Takiguchi, Higashimurayama, Japan

[73] Assignee: Bridgestone Corporation, Tokyo, Japan

[21] Appl. No.: 606,485

[22] Filed: May 3, 1984

[30] Foreign Application Priority Data

May 9, 1983 [JP] Japan ................................. 58-79406

[51] Int. Cl.$^4$ .......................... B60C 1/00; B60C 11/00
[52] U.S. Cl. ................................. 152/209 R; 152/450; 152/525
[58] Field of Search ................ 152/330 R, 209 R, 374

[56] References Cited

U.S. PATENT DOCUMENTS

| 2,776,693 | 1/1957 | Ferrin ........................... | 152/330 R |
| 3,795,651 | 3/1974 | Yamaguchi et al. .......... | 152/330 R |
| 4,166,052 | 8/1979 | Kusakabe et al. ............ | 152/209 R |
| 4,342,670 | 8/1982 | Ahagon et al. ................ | 152/330 R |

FOREIGN PATENT DOCUMENTS

| 2397131 | 3/1979 | France ........................... | 152/209 R |
| 0135149 | 10/1980 | Japan ............................. | 152/209 R |

OTHER PUBLICATIONS

Wilkinson, C. S., Rubber Chem & Tech, 27, p. 255, 1954.
Conant, F. S., Rubber Chem & Tech, 22, p. 863, 1949.
Nörich, W. G., "The Friction of Polymer on Ice", Journal of the IRI, p. 192, Oct. 1972.
Moore, "The Friction of Pneumatic Tires", pp. 1–15, 1975.
Bassi, A. C., Rubber Chem & Tech., 38, p. 112, 1956.
Bulgin et al, Proc. 4th Rubber Tech. Conf. London, p. 193, 1962.
Translation into English of Claims of Japanese Patent Application Publication No. 57-59, 256.

Primary Examiner—Lois E. Boland
Attorney, Agent, or Firm—Sughrue, Mion, Zinn, Macpeak, and Seas

[57] ABSTRACT

Disclosed herein is a pneumatic tire suitable for running on snow and ice roads, a tread portion of which consists of a rubber composition comprising 0-60 parts by weight of a petroleum softener and 5—35 parts by weight of a low-temperature ester type plasticizer based on 100 parts by weight of a rubber blend consisting of 30-95 parts by weight of at least one rubber selected from the group consisting of natural rubber, polyisoprene rubber and styrene-butadiene copolymer rubber, 0-50 parts by weight of polybutadiene rubber, and 5-30 parts by weight of butyl rubber or halogenated butyl rubber.

5 Claims, 1 Drawing Figure

PNEUMATIC TIRE SUITABLE FOR RUNNING ON SNOW AND ICE ROADS

BACKGROUND OF THE INVENTION

(1) Field of the Invention

This invention relates to a pneumatic tire suitable for running on snow and ice roads, and more particularly to a pneumatic tire suitable for running on snow and ice roads which has improved tire performances by increasing the tread-gripping force of the tread portion on snow or ice road surface.

(2) Description of the Prior Art

There have heretofore been proposed various pneumatic tires suitable for running on snow and ice roads, but their tire performances are not necessarily satisfactory and further improvement thereof is still demanded. In this connection, investigations have hitherto been made on the materials of the tread portion in order to increase the tread-gripping force on snow or ice road surface. For instance, it is well-known from C. S. Wilkinson; RCT, 27, 255 (1954); F. S. Conant, RCT, 22, 863 (1949) and the like that the hardness of rubber at low temperature is lowered. As is known from the literatures such as W. G. Nörich, "The Friction of Polymer on Ice", Journal of the IRI, October, 1972 p.192, Desmond Moore; *The Friction of Pneumatic Tires* (1975), and the like, the tread-gripping force on the snow or ice road surface is improved by use of butadiene rubber, natural rubber or polyisoprene rubber in the rubber composition of the tread portion. However, according to these methods, the tread-gripping force on wet road surface is disadvantageously lowered. On the other hand, it is known from the literatures such as A. C. Bassi, RCT, 38, 1956; D. Bulgin, G. D. Hubberd, M. H. Walters: Proc. 4th Rubber Tech. Conf. London 193 (1962) and the like that a large amount of styrene-butadiene copolymer rubber, butyl rubber or carbon black is used for mitigating the decrease of the tread-gripping force on the wet road surface. In this case, however, the tire performances on snow and ice roads and rolling resistance are unfavorably lowered.

Further, Japanese Patent Application Publication No. 57-59,256 discloses that the rolling resistance and the wet-braking performance of the tire can be enhanced by adding more than 5 but not more than 30 parts by weight of polyisobutylene-isoprene rubbers containing 1.0–2.0% by weight of chlorine (Cl) or bromine (Br) (halogenated butyl rubber) alone or in admixture to natural rubber (NR) and polybutadiene rubber (BR) without substantially damaging the wear resistance. However, it has been pointed out that such a tire is practically insufficient from the standpoint of the tire performances on snow and ice roads.

SUMMARY OF THE INVENTION

It is, therefore, an object of the invention to provide a pneumatic tire which drastically improves the tread-gripping force on the snow or ice road surface without decreasing the tread-gripping force on the wet road surface, the wear resistance and the rolling resistance.

The inventor has made various studies with respect to the material of the tire tread portion in order to achieve the above object and found that the tread-gripping force on the snow or ice road surface is drastically increased by constituting the tread portion with a vulcanizable rubber composition comprising 0–60 parts by weight of a petroleum softener and 5–35 parts by weight of a low-temperature ester type plasticizer based on 100 parts by weight of a rubber blend consisting of 30–95 parts by weight of at least one rubber selected from the group consisting of natural rubber, polyisoprene rubber and styrene-butadiene copolymer rubber, 0–50 parts by weight of polybutadiene rubber, and 5–30 parts by weight of butyl rubber or halogenated butyl rubber to thereby provide a pneumatic tire having improved performances and suitable for running on snow and ice roads, and as a result the invention has been accomplished.

BRIEF DESCRIPTION OF THE DRAWINGS

The invention will be described with reference to the accompanying drawing, wherein.

DETAILED DESCRIPTION OF THE INVENTION

Figure 1:
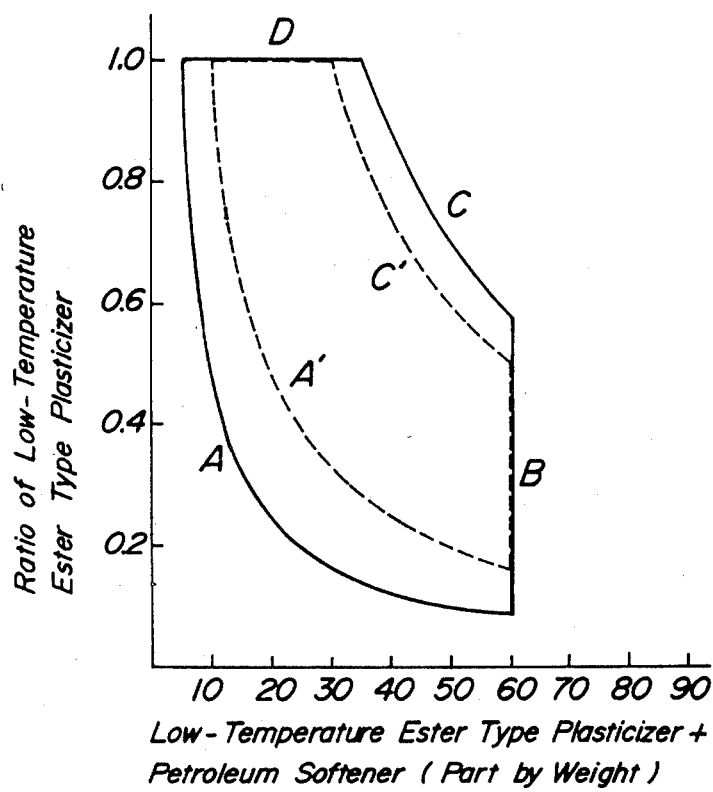
FIG. 1 is a diagram illustrating a ratio of a low-temperature ester type plasticizer in a mixture of low-temperature ester type plasticizer and petroleum softener used.

The pneumatic tire according to the invention is characterized in that the tread portion is made of the above rubber composition. As the starting rubber in this rubber composition is used a rubber blend consisting of (A) 30–95 parts by weight, preferably 35–95 parts by weight of at least one rubber selected from the group consisting of natural rubber, polyisoprene rubber and styrene-butadiene copolymer rubber, (B) 0–50 parts by weight, preferably 0–45 parts by weight of polybutadiene rubber, and (C) 5–30 parts by weight, preferably 5–25 parts by weight of butyl rubber or halogenated butyl rubber. If the component (A) of the starting rubber is less than 30 parts by weight, the performance on snow and ice roads or the tread-gripping force on the wet road surface lowers, while if it exceeds 95 parts by weight, the tread-gripping force on the wet road surface or the performance on snow and ice roads also lowers. If the component (B) exceeds 50 parts by weight, the tread-gripping force on the wet road surface and the resistance to chipping in the running on bad road are deteriorated. If the component (C) exceeds 30 parts by weight, the performance on snow and ice roads and the wear resistance are damaged, while if it is less than 5 parts by weight, the tread-gripping force on the wet road surface lowers.

Further, according to the invention, it is important to compound a low-temperature ester type plasticizer into the above starting rubber in order to improve the tread-gripping force on the snow or ice road surface. The amount of the plasticizer added is in a range of 5–35 parts by weight, preferably 10–30 parts by weight, based on 100 parts by weight of the starting rubber. If the amount of the plasticizer is less than 5 parts by weight, the improvement of the performance on snow and ice roads is insufficient, while if it exceeds 30 parts by weight, the wear resistance and the frictional force on the wet road surface unfavorably lower. The low-temperature ester type plasticizer includes, for example, derivatives of phthalic acid such as phthalic diester and the like; monobasic esters of aliphatic acids such as derivatives of oleic acid and the like; dibasic esters of aliphatic acids such as derivatives of adipic acid, azelaic acid, sebacic acid and the like; and derivatives of phosphoric acid. Among them, the derivatives of oleic acid are most preferable, an example of which includes butyl oleate, octyl oleate, decyl oleate, octyl ester of tall oil fatty acid, oleyl oleate, oleic diester ethylene glycol, oleic diester of 1,4-butanediol, oleic diester of 1,6-hexanediol, 2-ethylhexyl oleate, dodecyl oleate, decyl myristolate and oleyl myristolate. Preferably, octyl oleate is used.

Moreover, a petroleum softener may be used in an amount of not more than 60 parts by weight, preferably not more than 50 parts by weight of petroleum softener based on 100 parts by weight of the starting rubber together with the low-temperature ester type plasticizer. The petroleum softener is added for further increasing the tread-gripping force of the starting rubber on the snow or ice road surface. If the added amount exceeds 60 parts by weight, the wear resistance and the rolling resitance are deteriorated and the permanent deformation of tread may be caused during the running on bad road. As the petroleum softener, use may be made of paraffinic process oil, naphthenic process oil and aromatic process oil, which have a viscosity gravity contant (V.G.C.) of 0.8–1.0.

According to the invention, when the petroleum softener is used in combination with the low-temperature ester type plasticizer, it is preferable to set the ratio of both substances at an area surrounded by A-B-C-D in FIG. 1, preferably at an area surrounded by A'-B-C'-D.

Taking the total parts by weight of the low-temperature ester type plasticizer ester and the petroleum softener as "x" and the ratio of the low-temperature ester type plasticizer (part by weight of the low-temperature ester type plasticizer/x) as "y", curves A, A', C, C' in FIG. 1 are represented as follows:

Curve A: $y = 5/x$;

Curve A': $y = 10/x$;

Curve C: $y = 35/x$; and

Curve C': $y = 30/x$

Therefore, the area surrounded by A-B-C-D in FIG. 1 is:

$5/x \leq y \leq 35/x$, $y \leq 1$ and $x \leq 60$, while the area surrounded by A'-B-C'-D is:

$10/x \leq y \leq 30/x$, $y \leq 1$ and $x \leq 60$

As the low-temperature ester type plasticizer to be used together with the petroleum softener, the monobasic and dibasic esters of aliphatic acids are preferable because of their large plasticizing effect.

It is preferable to compound 40–100 parts by weight of carbon black as a reinforcement into the rubber composition according to the invention. If the amount of carbon black is less than 40 parts by weight, the wear resistance lowers, whereas if it exceeds 100 parts by weight, the productivity unfavorably becomes reduced.

Moreover, additives used in the ordinary rubber composition such as vulcanizing agent, vulcanization accelerator, secondary accelerator, antioxidant and the like may be compounded with the rubber composition according to the invention.

The object of the invention can be achieved by forming the tread portion with the above rubber composition. For the purpose of controlling the performances on snow and ice roads, it is important that the dynamic storage modulus (E') at −20° C. is not more than 200 kg/cm², preferably not more than 180 kg/cm², and E' at 0° C. is not more than 150 kg/cm², preferably not more than 130 kg/cm². Further, it is important to make the change of E' at such a temperature range small in order to maintain the performances on snow and ice roads under various environmental conditions. Particularly, if $E'(at\ -20°\ C.) - E'(at\ 0°\ C.) \leq 80\ kg/cm^2$, the change of the performances is favorably small.

The following examples are given in illustration of the invention and are not intended as limitations thereof.

EXAMPLES 1-11, COMPARATIVE EXAMPLES 1-12

Twenty three kinds of tires each having a tire size of 165 SR 13 were prepared by forming a tread portion with a rubber composition of a compounding recipe (parts by weight) shown in Table 1, respectively. With respect to each tire, the tread-gripping force on the snow or ice road surface, tread-gripping force on the wet road surface (wet skid resistance), wear resistance and rolling resistance were evaluated by the following methods on the basis of the actual running test to obtain results as shown in Table 1.

Evaluation Method (1) Tread-gripping force on the snow or ice road surface

A vehicle provided with the test tire was run on snow and ice roads at a speed of 20, 30 or 40 km/h and thereafter subjected to braking at the above speed. Then, a running distance required for completely stopping the vehicle was measured and represented by an index on the basis that the tire of Comparative Example 1 is 100.

(2) Wet skid resistance

A vehicle provided with the test tire was run on a wet asphalt road at a speed of 40 km/h, 70 km/h or 100 km/h and thereafter subjected to rapid braking at the above speed. Then, a running distance required for completely stopping the vehicle was measured and represented by an index on the basis that the tire of Comparative Example 1 is 100. The larger the index value, the better the property.

(3) Wear resistance

Apart from the tires used in the evaluation of the cornering stability, a tire was prepared by circumferentially dividing the tread portion into two sections, one of which being made of the tread rubber composition of Comparative Example 1, and run on a paved road over a distance of 50,000 km. Thereafter, the depth of the remaining tread grooves was measured, from which a distance required for obtaining wear loss of 1 mm was evaluated by an index on the basis that the tire of Comparative Example 1 is 100. The larger the index value, the better the property.

(4) Rolling resistance

The test tire subjected to an internal pressure of 1.7 kg/cm² was trained on a steel drum with a diameter of 1,707.6 mm and a width of 350 mm, which was rotated by the driving of a motor, at a speed of 80 km/hr under a load of 385 kg for 30 minutes and thereafter the rotating speed of the drum was raised to 200 km/hr. Then, the driving of the motor was stopped to run the drum by inertia, during which the rolling resistance of the tire to the drum at a speed of 50 km/hr was measured on a basis of deceleration speed of drum and time change. Next, a net rolling resistance of the tire was determined by substracting the previously calculated drum resistance from the measured value. In this case, the net rolling resistance was represented by an index on the basis that the tire of the Comparative Example 1 is 100. The larger the index value, the better the property.

(5) Measurement of E'

E' was measured by using a viscoelastic spectrometer made by Iwamoto Seisakusho under the conditions that the frequency was 50 cps and the dynamic strain ratio was 1% at the elongation of the static strain of 5%. The sample had a rectangular solid shape having a dimension of 20 mm in length, 5 mm in width and 2 mm in thickness.

TABLE 1

| | Example | | | | | | | | | | | Comparative Example | | | | | | | | | | | |
|---|---|---|---|---|---|---|---|---|---|---|---|---|---|---|---|---|---|---|---|---|---|---|---|
| | 1 | 2 | 3 | 4 | 5 | 6 | 7 | 8 | 9 | 10 | 11 | 1 | 2 | 3 | 4 | 5 | 6 | 7 | 8 | 9 | 10 | 11 | 12 |
| Natural rubber | 50 | 50 | 50 | 50 | 85 | 50 | 30 | — | — | 50 | 50 | — | 40 | 40 | 100 | 50 | 45 | 40 | 50 | — | 60 | — | — |
| Polyisoprene rubber | — | — | — | — | — | — | — | 40 | — | — | — | — | — | — | — | — | — | — | — | — | — | 20 | — |
| SBR (SBR 1500) | 35 | 35 | 35 | 35 | — | — | 10 | 45 | 40 | 35 | 35 | — | — | — | — | 35 | 35 | — | — | 100 | — | — | 100 |
| Polybutadiene rubber (BR 01) | — | — | — | 35 | — | 35 | 45 | 45 | 40 | 15 | — | 100 | 20 | 60 | — | — | 35 | 20 | 35 | — | 38 | 40 | — |
| Butyl rubber | 15 | 15 | 15 | 15 | 15 | 15 | 15 | 15 | — | — | — | — | 40 | — | — | 15 | 20 | 40 | 15 | — | 2 | 40 | — |
| Chlorobutyl rubber (HT 1068) *1 | — | — | — | — | — | — | — | — | 20 | — | 15 | — | — | — | — | — | — | — | — | — | — | — | — |
| Bromobutyl rubber (Polyser-X2) *2 | 15 | — | — | — | — | — | — | — | — | — | — | — | — | — | — | — | — | — | — | — | — | — | — |
| Carbon black (N 339) | 80 | 80 | 80 | 80 | 80 | 60 | 80 | 80 | 80 | 60 | 80 | 60 | 80 | 80 | 80 | 80 | 80 | 80 | 115 | 65 | 80 | 80 | 80 |
| Petroleum softener | | | | | | | | | | | | | | | | | | | | | | | |
| Aromatic oil | 35 | 35 | 35 | 10 | 35 | — | 35 | 35 | 35 | — | 35 | 15 | 35 | 35 | 35 | 45 | 10 | 45 | 65 | — | 35 | 35 | 35 |
| Spindle oil | — | — | — | 30 | — | 25 | — | — | — | 25 | — | — | — | — | — | — | — | — | — | — | — | — | — |
| Ester type plasticizer | | | | | | | | | | | | | | | | | | | | | | | |
| Monobasic ester of aliphatic acid (butyl oleate) | — | — | 15 | 10 | 15 | 10 | 15 | 15 | 15 | 10 | — | — | 15 | 15 | 15 | — | 40 | — | 15 | — | — | — | 15 |
| Dibasic ester of aliphatic ester (DOS) | — | 15 | — | — | — | — | — | — | — | — | — | — | — | — | — | — | — | — | 15 | — | 15 | 15 | — |
| Phthalic diester (DOP) | 15 | — | — | — | — | — | — | — | — | — | 15 | — | — | — | — | — | — | — | — | 20 | — | — | — |
| Monobasic ester of aliphatic acid (octyl oleate) | — | — | — | — | — | — | — | — | — | — | — | — | — | — | — | — | — | — | — | — | — | — | — |
| Stearic acid | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |
| Antioxidant (IPPD) *3 | 3 | 3 | 3 | 3 | 3 | 3 | 3 | 3 | 3 | 3 | 3 | 3 | 3 | 3 | 3 | 3 | 3 | 3 | 3 | 3 | 3 | 3 | 3 |
| Zinc white | 3 | 3 | 3 | 3 | 3 | 3 | 3 | 3 | 3 | 3 | 3 | 3 | 3 | 3 | 3 | 3 | 3 | 3 | 3 | 3 | 3 | 3 | 3 |
| Vulcanization accelerator | | | | | | | | | | | | | | | | | | | | | | | |
| TT *4 | — | 0.1 | — | — | — | — | — | — | 0.3 | 0.2 | 0.2 | 0.3 | 0.1 | 0.1 | — | — | 0.2 | 0.1 | — | 0.3 | — | 0.1 | 0.3 |
| DPG *5 | 0.2 | 0.2 | 0.2 | 0.2 | — | 0.2 | 0.4 | 0.4 | 0.5 | 0.8 | 0.8 | 0.7 | 0.2 | — | — | 0.2 | 0.4 | 0.2 | 0.2 | 0.7 | 0.1 | 0.5 | 0.7 |
| DM *6 | 0.8 | 0.8 | 0.8 | 0.8 | — | 0.8 | 0.6 | 0.6 | 0.6 | — | — | — | 0.8 | 0.9 | 1.2 | 0.8 | 0.8 | 0.8 | 0.8 | — | 1.0 | 1.0 | — |
| NOBS *7 | — | — | — | 1.2 | 1.0 | 1.5 | 1.5 | 1.5 | 1.5 | 1.9 | 0.8 | — | — | — | — | — | 1.7 | — | — | — | 1.5 | 1.5 | 1.5 |
| Sulfur | 1.5 | 1.5 | 1.5 | 1.5 | 1.5 | 1.5 | 1.5 | 1.5 | 1.5 | 1.5 | 1.5 | 1.5 | 1.5 | 1.5 | 1.5 | 1.5 | 1.5 | 1.5 | 1.5 | 1.5 | 1.5 | 1.5 | 1.5 |
| E' (at 0° C.) *8 | 105 | 103 | 101 | 97 | 107 | 102 | 105 | 116 | 111 | 108 | 103 | 145 | 133 | 121 | 113 | 124 | 125 | 140 | 145 | 128 | 102 | 131 | 129 |
| E' (at −20° C.) *8 | 163 | 140 | 135 | 131 | 165 | 135 | 158 | 163 | 178 | 140 | 137 | 245 | 224 | 137 | 185 | 210 | 200 | 235 | 232 | 221 | 180 | 230 | 225 |
| E' (at −20° C.) − E' (at 0° C.) | 58 | 37 | 34 | 34 | 58 | 33 | 53 | 47 | 67 | 32 | 34 | 100 | 91 | 16 | 72 | 86 | 75 | 95 | 87 | 93 | 78 | 99 | 96 |
| Braking on ice | 120 | 133 | 135 | 140 | 118 | 130 | 121 | 118 | 113 | 126 | 129 | 100 | 99 | 128 | 115 | 105 | 110 | 92 | 98 | 105 | 117 | 99 | 103 |
| Braking on snow | 115 | 126 | 128 | 133 | 112 | 128 | 113 | 114 | 108 | 127 | 101 | 100 | 96 | 122 | 109 | 102 | 113 | 91 | 97 | 105 | 113 | 97 | 101 |
| Braking on wet | 104 | 103 | 103 | 101 | 104 | 100 | 103 | 100 | 115 | 100 | 101 | 100 | 118 | 71 | 90 | 101 | 96 | 119 | 103 | 95 | 82 | 105 | 105 |
| Wear resistance | 101 | 101 | 102 | 102 | 101 | 105 | 102 | 100 | 109 | 99 | 107 | 100 | 73 | 98 | 95 | 95 | 83 | 71 | 75 | 97 | 101 | 75/95 | 105 |
| Rolling resistance | 109 | 111 | 114 | 125 | 105 | 125 | 105 | 107 | 102 | 118 | 124 | 100 | 87 | 105 | 103 | 105 | 109 | 89 | 85 | 103 | 104 | 85 | 93 |

Note:
*1 made by Exxon Chemical Company, trade name
*2 bromobutyl X2 made by Polyser Ltd., trade name
*3 N—phenyl-N'—isopropyl-p-phenylenediamine
*4 tetramethylthiuram disulfide
*5 diphenyl guanidine
*6 dibenzothiazyldisulfide
*7 N-oxydiethylene-2-benzothiazolylsulfeneamide
*8 dynamic storage modulus

EXAMPLES 12-14, COMPARATIVE EXAMPLE 13

Four kinds of tires each having a tire size of 165 SR 13 were prepared by forming a tread portion with a rubber composition of a compounding recipe (parts by weight) shown in the following Table 2, respectively, and their tire performances were evaluated in the same manner as described in Example 1 to obtain results as shown in Table 2. The braking performances, wear resistance and rolling resistance were indicated by index on the basis that the tire of the Comparative Example 13 is 100.

TABLE 2

|  | Example | | | Comparative Example |
|---|---|---|---|---|
|  | 12 | 13 | 14 | 13 |
| Natural rubber | 40 | 40 | 30 | 40 |
| SBR (SBR 1500) | — | — | 15 | — |
| Polybutadiene rubber (BR 01) | 40 | 40 | 35 | 40 |
| Chlorobutyl rubber (HT 1066) | 20 | 20 | 20 | 20 |
| Carbon black (N 339) | 55 | 65 | 55 | 55 |
| Aromatic oil | — | 2 | — | 8 |
| Butyl oleate | 8 | 12 | 10 | — |
| Zinc white | 5 | 5 | 5 | 5 |
| Stearic acid | 2 | 2 | 2 | 2 |
| NOBS | .8 | .8 | .8 | .8 |
| Sulfur | 2 | 2 | 2 | 2 |
| Braking on ice | 108 | 110 | 110 | 100 |
| Braking on snow | 107 | 108 | 107 | 100 |
| Braking on wet | 99 | 102 | 103 | 100 |
| Wear resistance | 99 | 98 | 103 | 100 |
| Rolling resistance | 106 | 104 | 105 | 100 |

As mentioned above, since the tread-gripping force on the snow or ice road surface is drastically enhanced by forming the tread portion with the rubber composition as compounded above without damaging the tread-gripping force on the wet road surface, the wear resistance and rolling resistance, the pneumatic tire according to the invention is extremely effective for running on snow and ice roads.

What is claimed is:

1. A pneumatic tire suitable for running on snow and ice roads, characterized in that a tread portion of the tire consists of a rubber composition comprising 0–60 parts by weight of a petroleum softener and 5–35 parts by weight of a low-temperature ester type plasticizer based on 100 parts by weight of a rubber blend consisting of 35–95 parts by weight of at least one rubber selected from the group consisting of natural rubber, polyisoprene rubber and styrene-butadiene copolymer rubber, 0–45 parts by weight of polybutadiene rubber, and 5–25 parts by weight of butyl rubber or halogenated butyl rubber, wherein said low-temperature ester type plasticizer is selected from the group consisting of phthalic diester, derivatives of oleic acid, derivatives of adipic acid, derivatives of azelaic acid, derivatives of sebacic acid and derivatives of phosphoric acid.

2. The pneumatic tire according to claim 1, wherein said rubber composition contains 0–50 parts by weight of the petroleum softener and 10–30 parts by weight of the low-temperature ester type plasticizer based on 100 parts by weight of the rubber blend.

3. The pneumatic tire according to claim 1, wherein said petroleum softener is paraffinic process oil, naphthenic process oil, or aromatic process oil and has a viscosity gravity constant (V.G.C.) of 0.8–1.0.

4. The pneumatic tire according to claim 1, wherein the ratio of the low-temperature ester type plasticizer and the petroleum softener is as follows:

$$25/x \leq y \leq 35/x,\ y \leq 1,\ \text{and}\ x \leq 60,$$

in which x is a total parts by weight of the low-temperature ester type plasticizer and the petroleum softener, and y is the ratio of the low-temperature ester type plasticizer to the petroleum softener.

5. The pneumatic tire according to claim 4, wherein the ratio of the low-temperature ester type plasticizer and the petroleum softener is as follows:

$$10/x \leq y \leq 30/x,\ y \leq 1\ \text{and}\ x \leq 60.$$

* * * * *